United States Patent [19]

Worrell et al.

[11] Patent Number: 4,935,825
[45] Date of Patent: Jun. 19, 1990

[54] CYLINDER DEFECT MANAGEMENT SYSTEM FOR DATA STORAGE SYSTEM

[75] Inventors: Devon B. Worrell, Westminister; William C. Caldwell, Fountain Valley; Paul W. Hanmann, Anaheim; Robert W. Visser, Huntington Beach; Paul R. Nitza, Tustin, all of Calif.

[73] Assignee: Emulex Corporation, Costa Mesa, Calif.

[21] Appl. No.: 285,808

[22] Filed: Dec. 16, 1988

[51] Int. Cl.$^5$ .............................................. G11B 5/09
[52] U.S. Cl. ........................................ 360/54; 360/53
[58] Field of Search ......................... 360/48, 49, 53, 54

[56] References Cited

U.S. PATENT DOCUMENTS 4,706,136 11/1987 Wentzel ................................ 360/53

Primary Examiner—Vincent P. Canney
Attorney, Agent, or Firm—Spensley Horn Jubas & Lubitz

[57] ABSTRACT

A system for managing data errors and media defects on magnetically and optically encoded disks. The invention is a disk controller utilizing a cylinder-based defect management system that reduces the amount of physical media space needed for bad block data replacement blocks. A unique attribute is calculated for and stored with each data block on each track that permits the controller to rapidly determine if a desired data block is in the current track. Spare blocks within a cylinder may be allocated to any track within that cylinder, permitting the system to more efficiently handle larger media or data errors than prior art devices that are limited to a particular number of spare blocks per track. When a bad data block occurs, the data from that block and all subsequent blocks is "slipped" to succeeding data blocks, thereby preserving the contiguity of the logical data structure and minimizing disk access time. No re-vectoring to replacement data blocks is done until an entire track is replaced, thereby reducing the amount of error-handling time compared to prior art techniques.

14 Claims, 6 Drawing Sheets

FIGURE 3:

| Track 00 | Log 00<br>LBA 00<br>Phy 00 | Log 01<br>LBA 01<br>Phy 01 | Log 02<br>LBA 02<br>Phy 02 | Log 03<br>LBA 03<br>Phy 03 | Log 04<br>LBA 04<br>Phy 04 | 1st alt<br><br>Phy 05 | 2nd alt<br><br>Phy 06 |
|---|---|---|---|---|---|---|---|
| Track 01 | Log 00<br>LBA 05<br>Phy 00 | Log 01<br>LBA 06<br>Phy 01 | Log 02<br>LBA 07<br>Phy 02 | Log 03<br>LBA 08<br>Phy 03 | Log 04<br>LBA 09<br>Phy 04 | 1st alt<br><br>Phy 05 | 2nd alt<br><br>Phy 06 |
| Track 02 | Log 00<br>LBA 10<br>Phy 00 | Log 01<br>LBA 11<br>Phy 01 | Log 02<br>LBA 12<br>Phy 02 | Log 03<br>LBA 13<br>Phy 03 | Log 04<br>LBA 14<br>Phy 04 | 1st alt<br><br>Phy 05 | 2nd alt<br><br>Phy 06 |

FIGURE 3A:

| Track 00 | Log 00<br>LBA 00<br>Phy 00 | BAD<br>BAD<br>BAD | Log 01<br>LBA 01<br>Phy 02 | Log 02<br>LBA 02<br>Phy 03 | Log 03<br>LBA 03<br>Phy 04 | Log 04<br>LBA 04<br>Phy 05 | 2nd alt<br><br>Phy 06 |
|---|---|---|---|---|---|---|---|
| Track 01 | Log 00<br>LBA 05<br>Phy 00 | Log 01<br>LBA 06<br>Phy 01 | Log 02<br>LBA 07<br>Phy 02 | Log 03<br>LBA 08<br>Phy 03 | Log 04<br>LBA 09<br>Phy 04 | 1st alt<br><br>Phy 05 | 2nd alt<br><br>Phy 06 |
| Track 02 | Log 00<br>LBA 10<br>Phy 00 | Log 01<br>LBA 11<br>Phy 01 | Log 02<br>LBA 12<br>Phy 02 | Log 03<br>LBA 13<br>Phy 03 | Log 04<br>LBA 14<br>Phy 04 | 1st alt<br><br>Phy 05 | 2nd alt<br><br>Phy 06 |

FIGURE 3B:

| Track 00 | Log 00<br>LBA 00<br>Phy 00 | BAD<br>BAD<br>BAD | BAD<br>BAD<br>BAD | Log 01<br>LBA 01<br>Phy 03 | Log 02<br>LBA 02<br>Phy 04 | Log 03<br>LBA 03<br>Phy 05 | Log 04<br>LBA 04<br>Phy 06 |
|---|---|---|---|---|---|---|---|

| Track 01 | Log 00<br>LBA 05<br>Phy 00 | Log 01<br>LBA 06<br>Phy 01 | Log 02<br>LBA 07<br>Phy 02 | Log 03<br>LBA 08<br>Phy 03 | Log 04<br>LBA 09<br>Phy 04 | 1st alt<br>Phy 05 | 2nd alt<br>Phy 06 |
|---|---|---|---|---|---|---|---|

| Track 02 | Log 00<br>LBA 10<br>Phy 00 | Log 01<br>LBA 11<br>Phy 01 | Log 02<br>LBA 12<br>Phy 02 | Log 03<br>LBA 13<br>Phy 03 | Log 04<br>LBA 14<br>Phy 04 | 1st alt<br>Phy 05 | 2nd alt<br>Phy 06 |
|---|---|---|---|---|---|---|---|

FIGURE 3C:

| Track 00 | Log 00<br>LBA 00<br>Phy 00 | BAD<br>BAD<br>BAD | BAD<br>BAD<br>BAD | BAD<br>BAD<br>BAD | Log 02<br>LBA 02<br>Phy 04 | Log 03<br>LBA 03<br>Phy 05 | Log 04<br>LBA 04<br>Phy 06 |
|---|---|---|---|---|---|---|---|

| Track 01 | Log 00<br>LBA 05<br>Phy 00 | Log 01<br>LBA 06<br>Phy 01 | Log 02<br>LBA 07<br>Phy 02 | Log 03<br>LBA 08<br>Phy 03 | Log 04<br>LBA 09<br>Phy 04 | 1st alt<br>Phy 05 | 2nd alt<br>Phy 06 |
|---|---|---|---|---|---|---|---|

| Track 02 | Log 00<br>LBA 10<br>Phy 00 | Log 01<br>LBA 11<br>Phy 01 | Log 02<br>LBA 12<br>Phy 02 | Log 03<br>LBA 13<br>Phy 03 | Log 04<br>LBA 14<br>Phy 04 | 1st alt<br>Phy 05 | 2nd alt<br>Phy 06 |
|---|---|---|---|---|---|---|---|

FIGURE 4:

| Track 00 | Log 00<br>LBA 00<br>Phy 00 | Log 01<br>LBA 01<br>Phy 01 | Log 02<br>LBA 02<br>Phy 02 | Log 03<br>LBA 03<br>Phy 03 | Log 04<br>LBA 04<br>Phy 04 | Log 05<br>LBA 05<br>Phy 05 | Log 06<br>LBA 06<br>Phy 06 |
|---|---|---|---|---|---|---|---|

| Track 01 | Log 00<br>LBA 07<br>Phy 00 | Log 01<br>LBA 08<br>Phy 01 | Log 02<br>LBA 09<br>Phy 02 | Log 03<br>LBA 10<br>Phy 03 | Log 04<br>LBA 11<br>Phy 04 | Log 05<br>LBA 12<br>Phy 05 | Log 06<br>LBA 13<br>Phy 06 |
|---|---|---|---|---|---|---|---|

| Track 02 | Log 00<br>LBA 14<br>Phy 00 | Log 01<br>LBA 15<br>Phy 01 | Log 02<br>LBA 16<br>Phy 02 | Log 03<br>LBA 17<br>Phy 03 | Log 04<br>LBA 18<br>Phy 04 | 1st alt<br><br>Phy 05 | 2nd alt<br><br>Phy 06 |
|---|---|---|---|---|---|---|---|

FIGURE 4A:

| Track 00 | Log 00<br>LBA 00<br>Phy 00 | Log 01<br>LBA 01<br>Phy 01 | BAD<br>BAD<br>BAD | Log 02<br>LBA 02<br>Phy 03 | Log 03<br>LBA 03<br>Phy 04 | Log 04<br>LBA 04<br>Phy 05 | Log 05<br>LBA 05<br>Phy 06 |
|---|---|---|---|---|---|---|---|

| Track 01 | Log 06*<br>LBA 06*<br>Phy 00 | Log 00<br>LBA 07<br>Phy 01 | Log 01<br>LBA 08<br>Phy 02 | Log 02<br>LBA 09<br>Phy 03 | Log 03<br>LBA 10<br>Phy 04 | Log 04<br>LBA 11<br>Phy 05 | Log 05<br>LBA 12<br>Phy 06 |
|---|---|---|---|---|---|---|---|

| Track 02 | Log 06*<br>LBA 13*<br>Phy 00 | Log 00<br>LBA 14<br>Phy 01 | Log 01<br>LBA 15<br>Phy 02 | Log 02<br>LBA 16<br>Phy 03 | Log 03<br>LBA 17<br>Phy 04 | Log 04<br>LBA 18<br>Phy 05 | 2nd alt<br><br>Phy 06 |
|---|---|---|---|---|---|---|---|

FIGURE 4B:

| Track 00 | Log 00<br>LBA 00<br>Phy 00 | Log 01<br>LBA 01<br>Phy 01 | BAD<br>BAD<br>BAD | Log 02<br>LBA 02<br>Phy 03 | Log 03<br>LBA 03<br>Phy 04 | Log 04<br>LBA 04<br>Phy 05 | Log 05<br>LBA 05<br>Phy 06 |
|---|---|---|---|---|---|---|---|

| Track 01 | BAD<br>BAD<br>BAD | Log 06*<br>LBA 06*<br>Phy 01 | Log 00<br>LBA 07<br>Phy 02 | Log 01<br>LBA 08<br>Phy 03 | Log 02<br>LBA 09<br>Phy 04 | Log 03<br>LBA 10<br>Phy 05 | Log 04<br>LBA 11<br>Phy 06 |
|---|---|---|---|---|---|---|---|

| Track 02 | Log 05*<br>LBA 12*<br>Phy 00 | Log 06*<br>LBA 13*<br>Phy 01 | Log 00<br>LBA 14<br>Phy 02 | Log 01<br>LBA 15<br>Phy 03 | Log 02<br>LBA 16<br>Phy 04 | Log 03<br>LBA 17<br>Phy 05 | Log 04<br>LBA 18<br>Phy 06 |
|---|---|---|---|---|---|---|---|

FIGURE 5:

| Track 00 | Log 00<br>LBA 00<br>Phy 00 | Log 01<br>LBA 01<br>Phy 01 | Log 02<br>LBA 02<br>Phy 02 | Log 03<br>LBA 03<br>Phy 03 | Log 04<br>LBA 04<br>Phy 04 | Log 05<br>LBA 05<br>Phy 05 | Log 06<br>LBA 06<br>Phy 06 |
|---|---|---|---|---|---|---|---|

| Track 01 | Log 00<br>LBA 07<br>Phy 00 | Log 01<br>LBA 08<br>Phy 01 | Log 02<br>LBA 09<br>Phy 02 | Log 03<br>LBA 10<br>Phy 03 | Log 04<br>LBA 11<br>Phy 04 | Log 05<br>LBA 12<br>Phy 05 | Log 06<br>LBA 13<br>Phy 06 |
|---|---|---|---|---|---|---|---|

| Track 02 | Log 00<br>LBA 14<br>Phy 00 | Log 01<br>LBA 15<br>Phy 01 | Log 02<br>LBA 16<br>Phy 02 | 1st alt<br>Phy 03 | 2nd alt<br>Phy 04 | 3rd alt<br>Phy 05 | 4th alt<br>Phy 06 |
|---|---|---|---|---|---|---|---|

FIGURE 5A:

| Track 00 | Log 00<br>LBA 00<br>Phy 00 | BAD<br>BAD<br>BAD | BAD<br>BAD<br>BAD | Log 01<br>LBA 01<br>Phy 03 | Log 02<br>LBA 02<br>Phy 04 | Log 03<br>LBA 03<br>Phy 05 | BAD<br>BAD<br>BAD |
|---|---|---|---|---|---|---|---|

| Track 01 | Log 04*<br>LBA 04*<br>Phy 00 | Log 05*<br>LBA 05*<br>Phy 01 | Log 06*<br>LBA 06*<br>Phy 02 | Log 00<br>LBA 07<br>Phy 03 | Log 01<br>LBA 08<br>Phy 04 | Log 02<br>LBA 09<br>Phy 05 | Log 03<br>LBA 10<br>Phy 06 |
|---|---|---|---|---|---|---|---|

| Track 02 | Log 04*<br>LBA 11*<br>Phy 00 | Log 05*<br>LBA 12*<br>Phy 01 | Log 06*<br>LBA 13*<br>Phy 02 | Log 00<br>LBA 14<br>Phy 03 | Log 01<br>LBA 15<br>Phy 04 | Log 02<br>LBA 16<br>Phy 05 | 4th alt<br>Phy 06 |
|---|---|---|---|---|---|---|---|

FIGURE 5B:

| Track 00 | Log 00<br>LBA 00<br>Phy 00 | BAD<br>BAD<br>BAD | BAD<br>BAD<br>BAD | BAD<br>BAD<br>BAD | Log 01<br>LBA 01<br>Phy 04 | Log 02<br>LBA 02<br>Phy 05 | Log 03<br>LBA 03<br>Phy 06 |
|---|---|---|---|---|---|---|---|

| Track 01 | Log 04*<br>LBA 04*<br>Phy 00 | Log 05*<br>LBA 05*<br>Phy 01 | Log 06*<br>LBA 06*<br>Phy 02 | Log 00<br>LBA 07<br>Phy 03 | Log 01<br>LBA 08<br>Phy 04 | Log 02<br>LBA 09<br>Phy 05 | Log 03<br>LBA 10<br>Phy 06 |
|---|---|---|---|---|---|---|---|

| Track 02 | Log 04*<br>LBA 11*<br>Phy 00 | Log 05*<br>LBA 12*<br>Phy 01 | Log 06*<br>LBA 13*<br>Phy 02 | Log 00<br>LBA 14<br>Phy 03 | Log 01<br>LBA 15<br>Phy 04 | Log 02<br>LBA 16<br>Phy 05 | 4th alt<br>Phy 06 |
|---|---|---|---|---|---|---|---|

CYLINDER DEFECT MANAGEMENT SYSTEM FOR DATA STORAGE SYSTEM

BACKGROUND OF THE INVENTION

1. Field Of The Invention

This invention relates to the field of data storage systems, and specifically to the area of data storage system controllers. The invention provides a new means for managing data errors and media defects on magnetic or optical disk storage systems.

2. Related Art

Data storage systems comprising magnetically encoded disk drives (or "disks") are an important component of most modern day data processing systems. More recently, erasable optical disk drives have been introduced, and are likely to compete with magnetic disks in some areas. Improvements in design and manufacturing technology for both types of drives has led to steadily increasing data capacity, access speeds, and data reliability while at the same time resulting in lower costs per storage unit. The increased performance from these improved disks has necessitated an equal improvement in the controllers which interface these devices with host computers.

Most disk controllers incorporate some form of microprocessor to perform the complex task of controlling the transfer of data to and from a disk. Ideally, a controller should be designed with sufficient flexibility to permit optimization of the interface between a host computer and a disk.

A primary objective of a disk controller is to minimize the access time of data transfers to and from a disk. Disk access times are not only a function of the physical characteristics of each particular disk, but also of the controller's ability to efficiently organize the format of the disk's data storage areas and to optimize movements of the disk's read/write heads. A controller accomplishes these tasks by segmenting a disk into logical components and coordinating data reads and writes so as to minimize disk access times. The performance of any data processing system is increased by reduced disk access times, resulting in faster retrieval and throughput of data to a host computer.

A further objective of a disk controller is to reduce the time required to process data defects that occur on a disk during normal operation. Since these type of defects (known as "organic" or "grown" defects) tend to increase on a disk over time, it is important for the controller to have a logical and efficient method for handling data errors caused by such defects. The greater the capacity for the controller to handle these kinds of errors, the less processing time will be required of the host computer to handle data errors.

Another objective of a disk controller is to minimize the physical space occupied by the storage overhead required to handle data errors or bad media segments while at the same time guaranteeing data integrity. Depending on the performance characteristics desired of the data storage system, this dual objective is usually accomplished by some combination of (1) the disk controller allocating a certain number of spare data storage areas to be distributed throughout the physical area of the disk and (2) error-correcting code techniques. However, by permitting a reduction in the amount of spare blocks required to handle a specified number of errors, a controller can also increase the data capacity of the disk.

Various techniques have been used in the prior art to accomplish the goals and objectives described above. Some earlier techniques simply invalidated an entire track (a collection of data storage segments; a track is usually defined as a set of sectors that physically form a ring on the disk media) if an uncorrectable error was detected within any data block of the track. These techniques are inefficient and unsatisfactory in terms of wasted storage space on the disk. Other methods invalidated only a defective data block. This was more space efficient, but such methods left a corresponding "hole" in the logical address space for the disk. Later methods utilized spare data blocks within each track to permit moving good data from a defective data block to a spare data block on the same track. The blocks were then re-numbered logically to preserve the logical order of the blocks in a particular track. In one such improvement on this concept, error-handling time is reduced by coding bad data blocks with the address information of a replacement data block. These later methods are also still less than optimal because they rely on one or more spare data blocks per track (which decreases data storage capacity), and the controller must re-vector (re-direct) the read/write heads more often to locate replacement data blocks.

SUMMARY OF THE INVENTION

The present invention is a disk controller utilizing a cylinder-based defect management system that reduces the amount of physical media space needed for bad block data replacement (a "cylinder" is a set of logically related tracks). In addition, a unique attribute is calculated for and stored with each data block on each track that permits the controller to rapidly determine if a desired data block is in the current track; if not, the search for the desired data block is immediately continued on another track. Average access time is therefore reduced. Further, no re-vectoring is done until an entire track is replaced, thus reducing the amount of error-handling time. Finally, since the spare blocks within a cylinder may be allocated to any track within that cylinder, the system is capable of more efficiently handling larger media or data errors than prior art devices that are limited to a particular number of spare blocks per track.

BRIEF DESCRIPTION OF THE DRAWINGS

The invention will become better understood by reference to the following detailed description when taken in conjunction with the accompanying drawings showing the preferred embodiment of the invention.

FIG. 3 is an representation of a cylinder composed of three tracks utilizing a track-based defect management system.

FIG. 4 is an representation of a cylinder composed of three tracks utilizing the inventive cylinder-based defect management system. There are no defects on any track, and no block has been reassigned.

FIG. 3A is an representation of a cylinder composed of three tracks utilizing a track-based defect management system. There is one bad block that has been reassigned to a spare block on the same track.

FIG. 3B is a representation of a cylinder composed of three tracks utilizing a track-based defect management system. There are two bad blocks, which have been reassigned to the spare blocks on the same track.

FIG. 3C is a representation of a cylinder composed of three tracks utilizing a track-based defect management system. There are three bad blocks, thus necessitating a track reassignment.

FIG. 4A is a representation of a cylinder composed of three tracks utilizing the inventive cylinder-based defect management system. There is one bad block in the cylinder that has caused a slipping of logical blocks from track to track.

FIG. 4B is a representation of a cylinder composed of three tracks utilizing the inventive cylinder-based defect management system. There are two bad blocks in the cylinder on two separate tracks.

FIG. 5 is a representation of a cylinder composed of three tracks utilizing the inventive cylinder-based defect management system. This configuration has four spare blocks compared to two shown in FIG. 4.

FIG. 5A is a representation of a cylinder composed of three tracks utilizing the inventive cylinder-based defect management system. This configuration has four spare blocks compared to two as in FIG. 4. There are three bad blocks in the cylinder that have caused a slipping of logical blocks from track to track.

FIG. 5B is a representation of a cylinder composed of three tracks utilizing the inventive cylinder-based defect management system. This configuration has four spare blocks compared to two shown in FIG. 4. There are three contiguous bad blocks in this cylinder.

Like numbers in the various drawings refer to like elements.

DETAILED DESCRIPTION OF THE PREFERRED EMBODIMENT

The present invention is a disk controller utilizing a cylinder-based error management system to increase the efficiency, capacity and error-handling capability of a disk data storage system.

Figure 1:
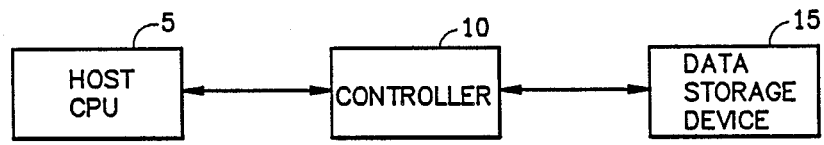
FIG. 1 is a block diagram of a typical data processing system.

A block diagram of a typical data processing system is shown in FIG. 1, composed of a host computer 5, a disk controller/interface 10, and a disk data storage subsystem 15. The disk controller 10 has a processor of its own to facilitate the interaction and requests of the host computer 5 and the disk 15.

Following is a brief synopsis of some of the terminology used in the explanation of the prior art and the operation of the invention.

A "disk" is a data storage device used by modern data processing systems to store and retrieve data. These disks typically are composed of one or more magnetic or optical data disk platters that revolve at high speeds around a central spindle. Various electronic circuits and actuators control the location and movement of read/write heads floating above the surface of the disk platters. These read/write heads are activated to read or write information on the surface of the disk platters magnetically or optically.

The smallest addressable unit of information usable on a disk is designated as a "sector". A "block" can be defined to be one or more sectors. Typically, each sector includes a header (containing various kinds of information, including address data, code flags, and in the present invention a special "Last Valid sector" [VALSEC] number), data, and error-correction code information. All the information stored on the disk is stored within blocks, and blocks are organized logically using an addressing scheme that makes best use of the particular disk drive's geometry and physical and electronic characteristics while minimizing the processing time needed by a host computer to store and retrieve information. The sectors of a multi-sector block need not be physically contiguous, but are logically contiguous.

Figure 2:
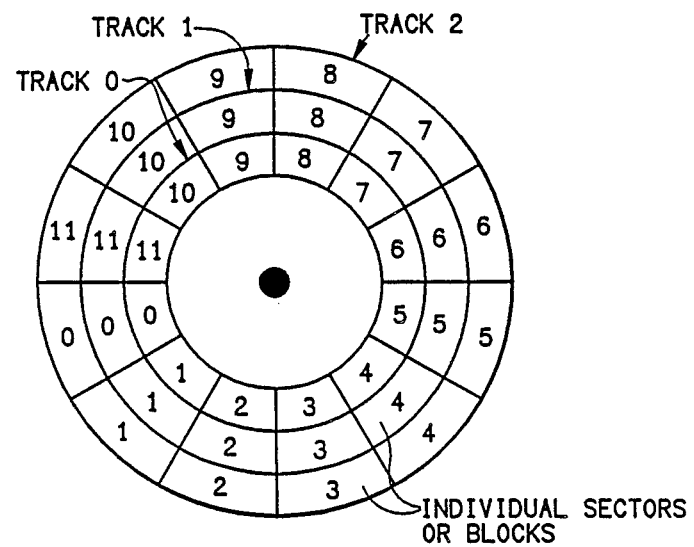
FIG. 2 is a pictorial description of the physical layout of a disk media surface formatted into sectors and tracks.

As part of this scheme to optimize the accessibility of a disk's information, blocks are typically grouped into logically contiguous units called "tracks". A typical track is shown in FIG. 2. A track is usually a concentric ring of logically and sometimes physically contiguous blocks.

The term "cylinder" refers to a collection of tracks. Each cylinder's tracks are usually set up by the controller in a manner most conducive to reducing the access times for read/write operations to the various logical addresses on the disk. "Access time" is the time required by the controller to actuate one of the read/write heads within the disk drive and locate a particular data block on a disk.

The term "slipping" refers to the process of rewriting data from a defective block to a next block, and the data from such "next" block to another next block, and so on from block-to-block, using a spare block to hold the last block of slipped "extra" data.

DATA DEFECT MANAGEMENT

The primary problems to be overcome in the areas of managing the structure of data on a disk as well as defects on disks are how to (1) minimize the time required to access data, and (2) minimize the space used on a disk by the spare blocks needed to manage defects which may appear during the use of the drive. Included in these problems are questions as to: how to minimize operating time and space overhead during defect management, how to ensure that the scheme does not degrade normal (read/write) system performance, how to minimize time and space used in employing special error recovery or defect maps, and finally how to accommodate defects across multiple blocks while minimizing track reassignments.

Following is a general description of previous solutions to these problems, and the improved solution of the current invention, called Zone Defect Management with Slipping ("ZDMS").

Until the current invention, defect management techniques centered on using spare (or "alternate") blocks per track; that is, such approaches defined a track to be a defect management "zone". These older forms of defect management generally require that data blocks and all associated spare blocks be located on a single physical track accessible only by a single read/write head. This is disadvantageous because it wastes space for spare blocks that might otherwise be used for data, and can lead to the loss of use of all of the good data blocks on a track if the number of bad blocks in the track exceed the number of spare blocks allocated to that track.

In some alternative prior art systems, bad data blocks can be replaced by spare blocks located on other tracks. This avoids the problem of losing all of the good blocks in a track when the number of bad blocks in the track exceed the number of spare blocks allocated to that track. However, such systems requiring time consuming re-vectoring to access the spare blocks located on other tracks.

The new ZDMS system defines the "zone" of defect management to be an entire cylinder. All data blocks and spare blocks are contained within multiple physical tracks accessible by multiple head selections (which do not require repositioning of the heads). A number of spare blocks are located within this larger zone (i.e., a cylinder). The number of spare blocks using ZDMS is normally less than the total number of spare blocks under the track-zone technique for the same number of tracks. Thus, more blocks are available for data storage. In addition, a unique attribute is calculated for and stored with each data block on each track that permits the controller to rapidly determine if a desired data block is in the current track. This significantly reduces the average access time of the disk for data when reassignments of bad data blocks has occurred.

In summary, when the defect management zone equals a track, a (user selected) quantity of spare blocks is required for each track on the cylinder. The number of spare blocks contained within a single cylinder is thus some multiple of the number of heads on the drive.

When the defect management zone equals a cylinder, a (user selected) quantity of spare blocks is specified for all tracks on a cylinder. This technique of defect management provides more storage area for user data. For example, in track-zone mode, on a drive with fifteen heads and one spare block per track (or zone), there would be a total of fifteen spare blocks per cylinder. Therefore, the total number of spare blocks on the drive would be 15*$N_c$ (where $N_c$ is the number of cylinders on the drive). On the same drive with the same number of cylinders using ZDMS, an allocation of five spare blocks per cylinder (or zone) would use only 5*$N_c$ spare blocks on the drive. Under the ZDMS system, the controller-disk combination would also have the ability to accommodate a defect on the disk up to five blocks in size without a track reassignment.

TRACK BASED (ZONE=TRACK) DEFECT MANAGEMENT

When the track-zone mode is used, the number of data blocks per track available for user data will be the total number of physical blocks per track minus the specified number of spare blocks per track (or zone). This is shown in FIG. 3, where for tracks 00, 01, and 02, the number of available data blocks is 5 per track, with 2 spare blocks per track. Shown are 21 physical blocks in 3 tracks, minus 6 spare blocks, giving a total of 15 available data blocks.

In track-zone defect management mode, generally all spare blocks reside at the logical end of the track.

Data can be stored in the blocks starting with the first logical block of the track, and continuing to the block just prior to the first spare block of the track. This allows contiguous access of all data on the track during a single revolution of the disk media. If no track or cylinder skew (i.e., an offset from track to track or cylinder to cylinder to compensate for access time differentials) is specified, the first logical block of a track will reside in the first physical block location, and spare blocks will be located at the physical end of the track.

A common track layout for track-zone defect management is shown in FIGS. 3, 3A, 3B and 3C. In FIG. 3, no track or cylinder skew is in effect and the initial logical block locations are the same as the physical locations ("LBA" in the FIGURES stands for "logical block address"). FIG. 3 depicts a drive with three heads (one per track), five user data blocks per track, and two spare blocks per track.

In FIG. 3A, one defect has occurred in track 00 at physical location 01, necessitating the use of one of the spare blocks; the remaining blocks have been slipped down the track. In FIG. 3B, the same track now has two defects, in physical locations 01 and 02. The data blocks have been slipped down into the spare blocks on the track. In FIG. 3C, another defect has occurred in physical location 03. At this point, since the only two spare blocks on track 00 have been used, the controller must now reassign track 00 to a different location on the disk. In all future accesses to the logical block numbers formerly stored on track 00, the controller will be re-vectored to the replacement track, requiring time consuming movement of the read/write heads.

CYLINDER BASED (ZONE=CYLINDER) DEFECT MANAGEMENT

When the inventive ZDMS cylinder-zone data defect management mode is employed, the number of data blocks per cylinder available for user data is the total number of physical blocks per cylinder minus the specified number of spare blocks per cylinder. This is illustrated in FIG. 4, where the number of physical blocks is 21 and the total number of spare blocks is 2, thus leaving a total of 19 blocks available for user data.

Spare blocks may reside at the logical end of a cylinder, or be interspersed throughout the length of a cylinder. If the spare blocks are located at the end of the cylinder, and if no block in a cylinder-zone has been reassigned, user data will be contained in the blocks starting with the first logical block of the track and continuing to the block just prior to the first spare block of the cylinder. This allows contiguous access of all data in the zone without additional revolutions of the disk media (only switching electronically between the read/write heads is required, which is quite fast). If no track or cylinder skew is specified, the first logical block of a track will reside in the first physical block location. Normally, for ease of implementation, spare blocks will reside at the physical end of the last track of the cylinder.

FIG. 4A shows a reassignment of a single bad block physically located at track 00, block 02. Logical block 02 is moved to the next available good block and all following logical blocks are slipped by one block. The first spare block is used for the last logical block in the cylinder-zone, making the original second spare block the remaining spare block. Logical block 06, which did reside on physical block 06 of track 00, has slipped and now resides on physical block 01 of track 01; logical block 13 has slipped from physical block 06 of track 01 to physical block 00 of track 02.

FIG. 4B shows the same cylinder after a bad block has now appeared on track 01 as well. When this happens, logical block 12 slips from physical block 06 of track 01 to physical block 00 of track 02, and the remainder of track 02 is reassigned down the length of the track, using up spare block 02. The next bad block in tracks 00, 01, or 02 will require reassignment of the entire track, since no further spare blocks are available.

FIG. 5 illustrates an example where the number of available data blocks in the cylinder is 17 and the number of spare blocks is 4. In this example, the number of data blocks is again greater than the number available under the track-zone defect management mode shown in FIG. 3. ZDMS also provides greater flexibility in defect correcting capability. As shown in FIG. 5A, even though three blocks are bad in track 01, no reassignment is necessary, and there is even an additional spare remaining on track 02. FIG. 5B also shows a similar situation, but now the defects have occurred in three contiguous blocks. The ZDMS system is capable of handling data defects greater in block size than track-zone management methods without the necessity for a track reassignment.

ADDITIONAL DESIGN FEATURES OF ZDMS

A disk controller normally has the ability to read and report block headers as they pass underneath a disk read/write head. This feature gives a controller using ZDMS a fundamental advantage over conventional controllers. Under the ZDMS system, a number code (the VALSEC number) is calculated and inserted into every data block header to indicate the last valid logical block number residing on that block's physical track. An important aspect of the present invention is that the VALSEC number allows the controller to rapidly determine (within the time it takes to read any block's header) if a desired data block is in the current track; if not, the search for the desired data block is continued on another track. This capability greatly enhances the overall access time of a drive using a ZDMS controller.

Thus, upon completion of a head seek, the first available block header readable by the read/write head will be read to determine whether the proper head is selected for the desired block. If a previous reassignment has caused the desired block to overflow to another track, a head switch is performed immediately, rather than continuing to search the track for a block that will not be found. The result of this is that the average latency will not exceed ½ a revolution plus one block time when the desired block has been moved from its original track due to reassignment. Therefore, when a block is reassigned to another track, it is not necessary that the old block header be read to determine the reassigned block's location.

As an example of the usage of the VALSEC numbers, if the Logical Block Address (LBA) of a desired block (e.g., logical block 05) has been calculated by the controller to reside on cylinder 00, track 00, physical block 5, and a seek/head switch has been performed to cylinder 00, track 00, the entire track does not have to be searched in order to determine if another head switch (to track 01) is necessary. That is, the VALSEC number of the first block in track 00 read by the controller will permit the controller to determine if the desired logical block 05 is still on that track; if not, the search for the desired data block is continued on the next track. Time is not wasted reading every block on the track to determine that the desired data is not present. This greatly minimizes the time required to do a read or write operation while still maintaining the data block contiguity desired for large block transfers.

The VALSEC number also is used by the controller to allow dynamic mapping of disk defects as they are discovered. The controller can read the header of the first available block on a track and determine if the block it is searching for is, in fact, going to be found on this physical track. Because of this, data from defective blocks can simply "skip" the defective area (track) and slip into the next available block on the next logical track. The following blocks would also be slipped until the appropriate number of spare blocks are used to the end of the cylinder. This approach keeps more data blocks contiguous, and reduces the number of reassigned tracks and blocks moved to remote locations. This slipping technique avoids the problem of excess head switching times required by moving a defective block's data to the spare blocks of another part of the cylinder.

The VALSEC number for each block of a track is identical; the VALSEC numbers for different tracks may differ. As previously indicated, the VALSEC number is the number of the last valid logical block number residing on a physical track. Any appropriate means for calculating the VALSEC number will suffice. One method is to permanently retain a table of the location (e.g., by cylinder, head number, bytes from index, and bit length of the defect) of every defect that is found on the disk (either during an initial formatting operation, or from grown defects detected during normal operation). From such a table, an "image" or map of each track can be generated that indicates each valid block and each bad block on the track. From this information, the logical number of the last valid block on a track can easily be determined. (For the last track of a cylinder, the VALSEC number is more simply determined as the number of physical blocks on the track less the number of spare blocks initially available).

REASSIGNMENT SEQUENCE

Figure 6:
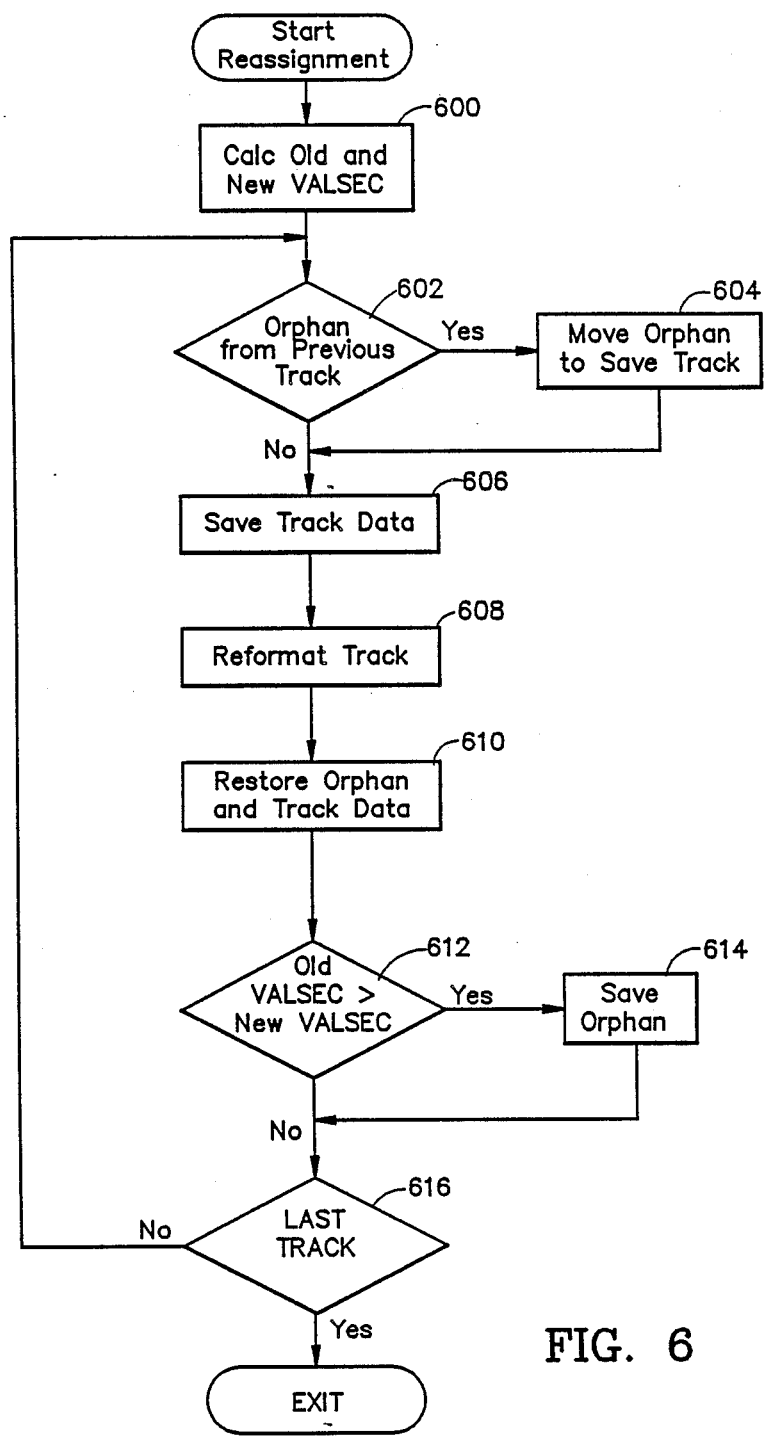
FIG. 6 is a flow chart of an algorithm that may be used by the inventive controller to manage the errors and defects discovered on a disk using the inventive cylinder-based defect management system.

One embodiment of a block and track reassignment procedure for the ZDMS system is shown in the flow chart of FIG. 6. Suppose that a block has become defective, and the remaining blocks need to be slipped down the cylinder. The controller would read each track and do the following:

1. Calculate the old and new VALSEC numbers (step 600).
2. Check to see if there are orphan blocks from a previous track that need to be saved on the replacement track (step 602). If yes, then the orphan blocks are save on a temporary work track (step 604).
3. The current track data is saved on a temporary work track (step 606).
4. A replacement track (which can be the original defective track) is reformatted (step 608) to mark out any defective areas.
5. The saved data from steps 604 and 606 is copied to the replacement track (step 610).
6. If the old VALSEC number is greater than the new VALSEC number (step 612), then a new orphan exists and is saved (step 614).
7. If the last track has not been processed, then repeat beginning at step 602; else, stop (step 616).

If no orphan from a previous track has been added to this track, then the VALSEC numbers computed will be the same; otherwise, if the old VALSEC is larger than the new VALSEC, this means that the last block on the current track must become an orphan and slip down to the next track. This procedure is done for every track in the cylinder during a slip or reassignment of a bad block.

The present invention can accommodate the allocation of spare blocks either at the end of the cylinder, or interspersed among the tracks of the cylinder. The latter variant has the advantage that fewer tracks will need to be reformatted and copied. Using the interspersed spare blocks form of the invention, the reassign sequence for a defective block proceeds as follows: first, if a spare is available on the same track, slip blocks on that track only; if a spare is not available on the same track, slip blocks and overflow the last block to the next or previous track in the same cylinder; continue to the cylinder boundary if necessary. Under this technique, blocks can be slipped either forwards or backwards according to the availability of spare blocks. After reassignment and slipping, the blocks will now continue to be logically contiguous.

If no spare blocks remain in a cylinder and a reassignment of a block or track is required, the controller can use one of the following options to finish the reassignment:

1. Reallocate one track of the cylinder to an alternate track.
2. Reallocate the entire cylinder to an alternate cylinder, preserving the physical integrity of the reallocated cylinder.
3. Reallocate the overflowing block(s) to an adjacent cylinder, minimizing access time on future reads and writes to that block.

The present invention utilizes ZDMS to minimize the required time to correct block errors, and to reduce the future access times required to locate requested data.

CONCLUSION

From the description of the preferred embodiment it is apparent that a number of alternatives, modifications and substitutions of the present invention could be constructed. For example, the procedure used for performing the slipping of blocks and the reassignment of a track can be implemented in a variety of ways, using whatever safeguards (e.g., redundant copying of data to temporary work tracks, error-correction codes, verification of copied data to original data before destruction of the original data, CRC checks, multiple read or write retries, etc.) may be deemed necessary to provide a reasonable level of confidence that data has been moved with integrity. Also, in some instances, certain features of the invention could be used without the corresponding use of other features. Therefore, this invention is not to be limited to the specific embodiment discussed and illustrated herein, but rather by the following claims.

What is claimed is:

1. In a data processing system including a host computer 5, a data storage controller/interface 10, and a data storage subsystem 15 on which data is stored in blocks and arranged in a plurality of tracks arranged in a plurality of cylinders, a defect management and data access system comprising:
   (a) means for inserting a control code within each data block of each track specifying the last non-defective data block of the track;
   (b) at least one spare data block located anywhere within each cylinder;
   (c) means for controlling defects in at least one data block of a track whereby the data from the defective data block is moved to one of said spare data blocks; and
   (d) means for modifying the control code within each data block of each track affected by such data movement, the control code specifying the current last non-defective data block of the track.

2. The defect management and data access system of claim 1, wherein each data block on a track is designated by a logical block designator, and the control code comprises the logical block designator of the last non-defective block on the track.

3. The defect management and data access system of claim 1, including means for reading the control code within the first readable data block of a first accessed track, and essentially immediately accessing a next track if a desired data block is outside the range specified by the control code as the last non-defective data block of the first accessed track, thereby reducing data access time.

4. The defect management and data access system of claim 1, including means for reassigning data from a track of a first cylinder to a track in a second cylinder if the first cylinder has a defective data block and the number of spare data blocks in the first cylinder has been exhausted.

5. A defect management and data access system comprising:
   (a) a data storage subsystem on which data is stored in blocks arranged in a plurality of tracks arranged in a plurality of cylinders;
   (b) means for providing at least one spare data block anywhere within each cylinder;
   (c) means for inserting a control code within each data block of each track specifying the last non-defective data block of the track;
   (d) means for controlling defects in at least one data block of a track whereby the data from the defective data block is moved to one of said spare data blocks; and
   (e) means for modifying the control code within each data block of each track affected by such data movement, the control code specifying the current last non-defective data block of the track.

6. The defect management and data access system of claim 5, including means for reading the control code within the first readable data block of a first accessed track, and essentially immediately accessing a next track if a desired data block is outside the range specified by the control code as the last non-defective data block of the first accessed track, thereby reducing data access time.

7. The defect management and data access system of claim 5, including means for reassigning data from a track of a first cylinder to a track in a second cylinder if the first cylinder has a defective data block and the number of spare data blocks in the first cylinder has been exhausted.

8. A method for accessing data and controlling data defects in a data storage subsystem on which data is stored in blocks arranged in a plurality of tracks arranged in a plurality of cylinders, comprising the steps of:
   (a) providing at least one spare data block anywhere within each cylinder;
   (b) inserting a control code within each data block of each track specifying the last non-defective data block of the track;
   (c) determining whether the data of a data block is defective such that the data for that block must be moved;
   (d) slipping the data from the track containing the defective block to a next series of data blocks within the cylinder containing the defective block; and
   (e) modifying the control code within each data block of each track affected by such slipping, the control code specifying the current last non-defective data block of the track.

9. The method for accessing data and controlling data defects of claim 8, wherein the step of modifying a control code comprises the further steps of:
 (a) computing the last valid block designator for each track affected by such slipping;
 (b) storing the computed last block designator within each data block of said tracks.

10. The method for accessing data and controlling data defects of claim 9, including the further steps of:
 (a) reading the last valid block designator within the first readable data block of a first accessed track;
 (b) essentially immediately accessing a next track if a desired data block is outside the range specified by the last valid block designator as the last non-defective data block of the first accessed track, thereby reducing data access time.

11. The method for accessing data and controlling data defects of claim 8, wherein the step of inserting a control code comprises the further steps of:
 (a) computing the last valid block designator for each track;
 (b) storing the computed last valid block designator within each data block of said track.

12. The method for accessing data and controlling data defects of claim 11, wherein the step of modifying a control code comprises the further steps of:
 (a) computing the last valid block designator for each track affected by such slipping;
 (b) storing the computed last valid block designator within each data block of said tracks.

13. The method for accessing data and controlling data defects of claim 12, including the further steps of:
 (a) reading the last valid block designator within the first readable data block of a first accessed track;
 (b) essentially immediately accessing a next track if a desired data block is outside the range specified by the last valid block designator as the last non-defective data block of the first accessed track, thereby reducing data access time.

14. The method for accessing data and controlling data defects of claim 8, including the further step of reassigning data from a track of a first cylinder to a track in a second cylinder if the first cylinder has a defective data block and the number of spare data blocks in the first cylinder has been exhausted.

* * * * *